US00RE39521E

(19) United States
(12) Reissued Patent
Herrington

(10) Patent Number: US RE39,521 E
(45) Date of Reissued Patent: Mar. 20, 2007

(54) RIBBED CORE DUAL WALL STRUCTURE

(75) Inventor: F. John Herrington, Bloomfield, NY (US)

(73) Assignee: Proleus, Inc., Bloomfield, NY (US)

(21) Appl. No.: 10/366,652

(22) Filed: Feb. 14, 2003

Related U.S. Patent Documents

Reissue of:
(64) Patent No.: 6,405,974
Issued: Jun. 18, 2002
Appl. No.: 09/626,886
Filed: Jul. 27, 2000

U.S. Applications:
(63) Continuation of application No. PCT/US99/17172, filed on Jul. 29, 1999.
(60) Provisional application No. 60/096,237, filed on Aug. 12, 1998, and provisional application No. 60/101,935, filed on Sep. 25, 1998.

(51) Int. Cl.
*B65H 75/10* (2006.01)
*B65H 75/18* (2006.01)

(52) U.S. Cl. ..... 242/609.4; 242/610.5; 242/610.6; 242/613.5; 138/148; 428/36.9; 425/321; 264/171.29; 264/209.2; 264/209.3

(58) Field of Classification Search ..... 242/609.4, 242/613.4, 613.5, 610.5, 610.6; 138/148, 138/112, 113, 114, 144; 428/34.1, 36.9, 36.91; 264/209.2, 209.3, 171.29, 177.17; 425/320, 425/321
See application file for complete search history.

(56) References Cited

U.S. PATENT DOCUMENTS 925,425 A * 6/1909 Casler ..... 242/613.5
2,756,032 A * 7/1956 Dowell ..... 138/148
3,056,563 A * 10/1962 Whitnah ..... 242/613.4
3,204,667 A * 9/1965 Zahorski ..... 138/148
3,235,203 A * 2/1966 Antliff ..... 242/613.4
3,379,221 A * 4/1968 Harry et al. ..... 138/148
3,495,628 A * 2/1970 Boender ..... 138/148
3,627,221 A * 12/1971 Nichols et al.
3,670,772 A * 6/1972 Ziemek et al. ..... 138/148
3,840,194 A * 10/1974 Vetter ..... 242/613.5
4,025,675 A * 5/1977 Jonda ..... 138/148
4,432,485 A * 2/1984 Smith ..... 138/148
4,461,323 A * 7/1984 Morikawa et al. ..... 138/148
4,509,447 A * 4/1985 Smith, Sr.
4,689,174 A * 8/1987 Lupke
4,919,358 A * 4/1990 Innocenti et al. ..... 242/610.5
5,127,441 A * 7/1992 Rains
5,423,353 A * 6/1995 Sorensen
5,536,461 A * 7/1996 King et al. ..... 264/209.3
5,580,622 A * 12/1996 Lockshaw et al. ..... 428/34.1
5,639,408 A * 6/1997 King et al. ..... 264/171.29
5,996,643 A * 12/1999 Stonitsch ..... 138/148
6,102,326 A * 8/2000 Liepold et al. ..... 242/610.6

FOREIGN PATENT DOCUMENTS

EP 0781 642 A1 2/1997

* cited by examiner

*Primary Examiner*—Kathy Matecki
(74) *Attorney, Agent, or Firm*—Michael G. Gilman

(57) ABSTRACT

An elongated composite tube made up of an inner tube 42 and an outer tube 44 (FIG. 3) with a plurality of elongated helical ribs disposed between the inner tube and the outer tube in a supporting relationship to both. A slinky like toy made from the composite tube is also disclosed, as is a method of making both.

45 Claims, 8 Drawing Sheets

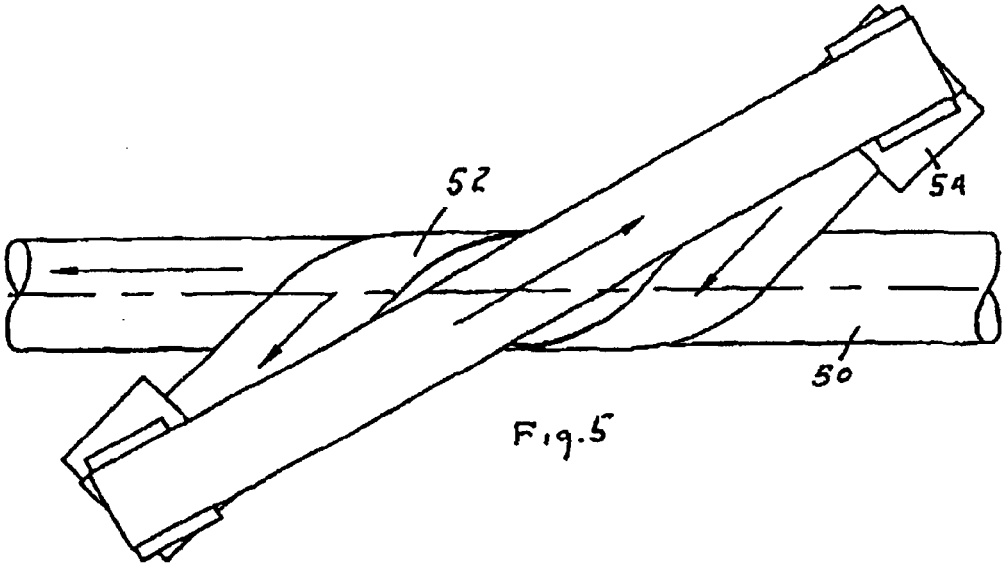
Fig.5
Fig.6
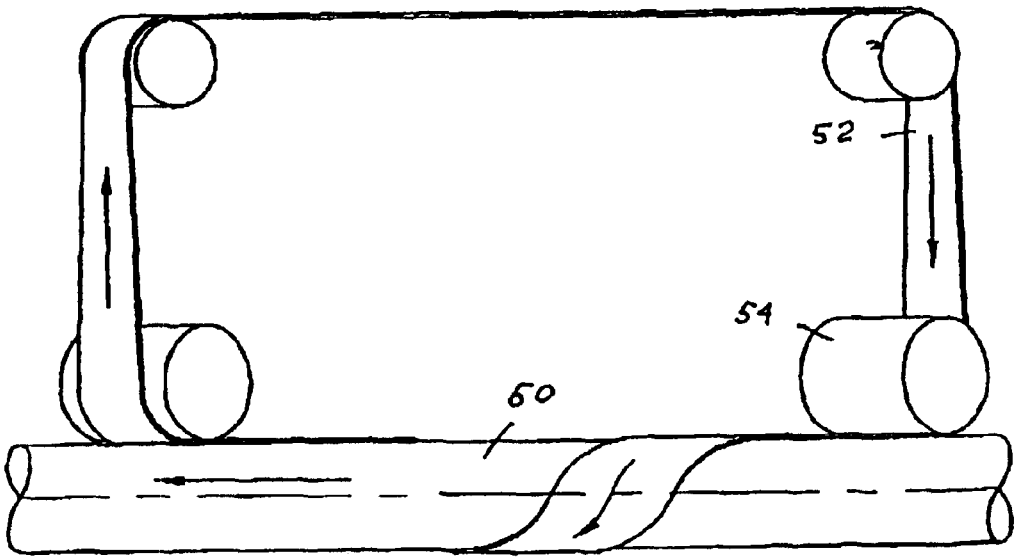

74
70
78
72
76
80

RIBBED CORE DUAL WALL STRUCTURE

Matter enclosed in heavy brackets [ ] appears in the original patent but forms no part of this reissue specification; matter printed in italics indicates the additions made by reissue.

This application is a continuation of PCT/US99/17172, filed on Jul. 29, 1999, which claims benefit of U.S. provisional applications No. 60/096,237, filled Aug. 12, 1998, and No. 60/101,935, filed on Sep. 26, 1998.

GENERAL FIELD OF THE INVENTION

This invention relates to generally tubular articles such as cores for rolled goods like carpets and plastic film. It more particularly refers to such cores that are light in weight and have unusually high crush resistance. It further relates to decorative toy articles made from such tubular articles.

BACKGROUND OF THE INVENTION

Cores for all kinds of rolled goods, such as plastic film, carpeting, paper products, and the like, are well known. In many instances, these cores are simply hollow cylindrical rolls of cardboard or other materials. In other cases, these cores may be solid plastic, wood or metal rods.

In one very old patent, U.S. Pat. No. 3,627,221, there is described a decorative end plug for rolled paper, such as newsprint. The end plug is made up of a centrally located opening for receiving an axially disposed shaft, a generally flat, solid, disc like portion 16 disposed radially about the shaft receiving axial opening 18, and a peripheral rim portion 20 disposed radially around the disc portion 16. From a consideration of FIG. 1 of this patent, it appears that a core 12 of the paper roll 10 is intended to fit about the rim portion 20. Put another way, the described end plug is intended to fit within the core of the roll of paper and the shaft (unnumbered) that will support the assembly is intended to pass through the axial opening 18 in the end plug.

The peripheral rim portion 20 of this disclosed end plug appears to be composed of a "U" shaped member that is made up of two concentric elements 26 and 30 that form the arms of the "U". A series of webs 34 and 36 appear to span the top of the "U". These webs and the arms of the "U" are so arranged as to form generally triangular areas or cells 38. This end plug is intended to help to support the ends of the paper roll on its cylindrical paper core. The depicted end plug is generally flat in cross section and is not disclose to pass axially all the way through the paper roll or its cylindrical paper core. In fact, this end plug is characterized by having a diameter that is substantially larger than its depth, that is, it is a disk-like shape rather than a tube-like shape. The end plug is said to taper inwardly in thickness from its periphery toward the central opening in order to increase its resiliency during its insertion into the end of the paper roll. The '221 patent says that the depicted flat, disc like end cap may be made of molded plastic, such as polyethylene. It is clear that the depicted end cap is not suited to have paper or other flat goods rolled up on it, but is only suited to be inserted into the end of an already made roll of paper or the like. Despite the support that the end plug of the '221 patent may give to the ends of the internal tubular paper central tube, the paper core 12 must be self supporting and able to withstand the weight of the paper rolled thereon over substantially the whole of its length.

It is to be noted that the '221 patent states that the disclosed end plug is intended to help protect the already made roll from damage during loading and unloading and during transit, not during the making of the roll of paper. This distinguishes that end plug of the prior art from the core structure of the instant invention which is intended for use in creating the roll of flat goods, especially stretch or shrink wrap plastic film (hereafter generally referred to as shrink wrap plastic film). The crush stress that is applied to the core by shrink wrap plastic film is substantially greater that what is applied by newsprint, and this stress increases with the amount of shrink wrap film that is wound on the central core. It increases further with the shrinkability of the film being wound and with the speed of winding of the film. Therefore, modern wrapping techniques use solid cores to support most industrial sized rolling of flat goods, from carpet to plastic film.

Solid wood plastic or steel rollers are quite heavy and add to the shipping costs of the material rolled on them. Further, solid cores of these materials are expensive and, although efforts at recycling have been attempted, they have not met with great success. The cost of the cores must then be added to the cost of the material that is wrapped on the cores. It is obvious that making the cores hollow and thin walled will substantially reduce their weight, and therefore their cost, and will also reduce the weight of the entire rolled product whereby reducing shipping costs as well. The problem with using hollow cores, however, is that hollow tubes necessarily have lower crush strength than solid cylinders of the same diameter and material. Further, and the thinner the wall of hollow cores, the less is their crush resistance. It has therefore been thought that the tradeoff between the weight and cost of the core and the crush strength of the core was just something the art had to accept, with the proper core selected for each application.

OBJECTS AND DESCRIPTION OF THE INVENTION

It is an important object of this invention to provide a hollow core tubular article, that can be used for, among other things, supporting rolled goods thereon.

It is an object of this invention to provide such a tubular article that is lighter in weight than previous similar articles, and yet has a substantially higher crush resistance than has been achieved in the past.

It is a further object of this invention to provide such a tubular article that has sufficient radial crush strength to support the stress of substantial quantities of flat goods, particularly shrink wrap plastic film, thereon.

It is another object of this invention to provide a method of making relatively inexpensive, crush resistant hollow tubes that are suited for use as cores in supporting rolled flat goods.

It is a still further object of this invention to provide novel means for improving the roundness of tubular articles, particularly hollow tubular articles that are made by an extrusion method.

It is a still further object of this invention to provide an improved method of making tubular articles of substantial length that have more consistent diameters than has been achievable in the past.

It is still another object of this invention to make a novel entertainment or toy article that is derived from the hollow tubular articles made according to this invention.

Other and additional objects of this invention will become apparent from a consideration of this entire specification, including the drawing hereof.

In accord with and fulfilling these objects, one aspect of this invention is an elongated hollow tubular article, sometimes referred to herein as a composite tube, comprising a smaller diameter inner, generally hollow, tubular element and a larger diameter outer, generally hollow tubular element with at least one web of material disposed between, and attached to, both the inner and outer elements. The intermediate web(s) of material enable the inner and outer tubes to maintain their radial spacing from each other. Preferably there are a plurality of such webs of material disposed between, and attached to, both the inner and outer elements or walls. These plural webs are suitably spaced from each other. Most preferably, these ribs or webs are substantially equidistantly spaced apart angularly (sometimes hereafter referred to as radially spaced apart ribs) within the toroidal area between the inner and the outer tubes. These plural webs or ribs are preferably disposed in locations such that at least some of them, and preferably all of them, contact, and support, the radial spacing of both the inner and outer tubes, respectively, at locations where other such ribs also contact the inner and outer walls respectively. Put another way, each rib contacts the inner and outer tube and at the same time contacts, or at least is close to the point where the next adjacent rib also contacts, either the inner or the outer tubular wall, respectively. In one embodiment of this invention, this configuration causes a rib to be in contact with its next adjacent rib at the same time as it is in contact with one of the inner or outer tubes whereby forming generally triangular strut-like members. In another embodiment, this configuration causes a rib to be closely adjacent to its next adjacent rib at the point where it contacts either the inner or outer tubular wall whereby forming generally trapezoidal strut-like members.

Preferably, each rib contacts both ribs that are next adjacent on each side thereof at the same time as it contacts the inner and outer tubular walls, respectively, or is at least proximate to both of these next adjacent ribs at the point where it contacts both the inner and outer walls, respectively. This structure includes a rib structure between the inner and outer tubes where each rib and its next adjacent rib, together with the wall of the tube that is enclosed by the two next adjacent ribs, defines a series of substantially triangular or trapezoidal cells formed by one tube and two ribs each. These cells are not exactly triangular in cross section because the tube wall of the cell is arcuate and therefore the cross section of the cells is only approximately triangular or trapezoidal, respectively.

It is a preference in the structure of the composite tube of this invention to slightly space the ribs apart at the points where they intersect the arcuate wall of one of the tubes. In this manner, the preferred cellular structure, having a cross section that approximates a partially spherical trapezoid, is formed. The slightly trapezoidal shape of the spacing cells has been found to be desirable and an improvement over the triangular cell cross section because, when the composite tube of this invention having generally trapezoidal cellular ribs is made by extrusion of molten plastic or metal material, an excess of the rib material does not accumulate at the point where the ribs contact the inner or outer tubular walls, respectively.

It is preferred that each rib extend the whole length of the composite tubular article of this invention, and that it contact and be adhered to and support both of the inner and outer tubes, respectively, along its entire length. However, this is not an absolute requirement. The ribs(s) may be attached to the inner and/or outer tubes at intermittent areas so long as the total amount of attachment is sufficient to accomplish the purposes of this invention, that is to maintain substantially consistent spacing between the inner and outer tubes while at the same time providing sufficient radial support to avoid the composite tube being crushed by the flat form film or sheet material wound thereon.

The rib(s) should preferably extend continuously from one end of the composite tubular structure of this invention to the other, but this is not an absolute requirement. The rib(s) may be interrupted along their length, and/or, any one or more of them may extend only [pat] *part* way along the entire length of the composite article. It is important that the ribs as a collective whole extend substantially the entire length of the tubular article because where there are no ribs, there is no structure to maintain the spacing between the inner and the outer tubes. Under these circumstances, the composite tubular article could be crushed and collapse, under the radial stress of the flat goods rolled thereon, whereby defeating the entire purpose of this invention.

The ribs can be generally rectangular in cross section, but this geometric shape is not an absolute requirement of this invention. The ribs may have a triangular or trapezoidal, or any other desired, cross section. Further, although it is preferred that the ribs be substantially constant in cross section and area over their entire length, the cross sectional area and/or geometry of the rib(s) may change over the length of the composite tube. The geometry and cross section may also, or alternatively, change from rib to rib, as appropriate. Any combination of these parameters is considered to be within the scope of this invention.

The preferred mode of operation of this invention is to provide a plurality of ribs substantially uniformly angularly distributed about the periphery of the outside surface of the inner tube (and consequently about the inner surface of the outer tube). The cross section of each rib is preferably the same from rib to rib and along the entire length of the ribs, and is substantially rectangular. The cells formed between the next adjacent ribs and the walls of the inner and outer tubes may be generally triangular in cross section, but are preferably all substantially trapezoidal in cross section.

It is well known that triangular shapes are the strongest structural shapes for a given weight and type of material, and that the further the structure departs from a true triangle, the less rigid and strong is the resulting shape. Therefore, the trapezoidal shapes of this embodiment of this invention give up some of their strength in exchange for lighter weight and lower cost (because of less material being used). It is therefore preferred that the length of the smaller leg of the trapezoid be no more than about 10% of the length of the longer leg of the trapezoid. Of course it will be realized that these trapezoidal legs that are being referred to here are not straight as in the real trapezoid geometric shape, but rather are segments of the arcuate walls of the inner and outer tubes. The truss sections are therefore geometric shapes that approach a trapezoid, rather than actually being an exact trapezoid.

The inner and outer walls are preferably concentric, but they may depart from absolute concentricity in that one or the other may be eccentric, that is not of circular cross section. In the alternative, the tubular walls may be out of concentricity by both of the tubular walls being of circular cross section but having centers that are not coincident The ribs must be of such a size and shape as to follow any eccentricity that may exist. The term "concentric" will be applied to the inner and outer tubes of this invention in this specification and the claims appended hereto in this broad sense, that is sufficiently concentric to accomplish the purposes of this invention, but not necessarily absolutely concentric. The term, "concentric" should therefore not be taken as a structural limitation on the articles of this invention but rather as a description of the relationship between the walls as being inner and outer.

The inner and outer walls of the composite tubes of this invention may be the same or different, but are preferably of circular cross section. Their cross sections may be of other shapes, such as elliptical, or for that matter any shape that suits the ultimate use to which the core will be put. Of great [important] *importance* to the article of this invention is the disposition of longitudinal ribs between, and joining, the inner and outer tubes, and supporting each of them. The combination of the "off-radial" disposition of the longitudinal ribs (that is to form generally trapezoidal truss cells), and the inner and outer tubular walls creates a structure that withstands substantially greater crushing forces than would either the inner or the outer walls by themselves, or even a single wall having the thickness of the inner and outer tubes combined.

These above described ribbed hollow wall cylindrical cores have performed very well in tests conducted to determine their crush resistance. It has been found that the "off-radial" ribbed (trapezoidal) structure is substantially stronger and more crush resistant that a hollow wall core with only spaced radial ribs. It has been found, however that when the bi-wall composite tube of this invention is squeezed between flat plates, such as is approximated by closing the jaws of a vise, the mode of failure of the structure is a buckling of some of the inner and outer tube wall segments between the ribs (off-radial or radial) that are proximate to the jaws of the vise. The forces acting on the hollow wall cores when pressed between flat, diametrically opposed plates is to compress the outer wall of the portions of the core that are in contact with the pressure plates of the vise, and to compress tube inner wall in those locations that are 90° from the points where the pressure is being applied. It is these specific inner and outer wall [segment] *segments,* respectively, that buckle first. Where the ribs are generally longitudinal in disposition, the wall buckling progresses all the way down the length of the composite structure of this invention between the ribs as aforesaid.

According to a most preferred aspect of this invention, therefore, the ribs are disposed in a helical pattern along the length of the toroidal space between the inner and the outer tubes. In this manner, a buckling of any one rib element, by reason of pressure being applied in the radial direction between flat plates, will not have an unimpeded longitudinal path from one end of the composite tube structure of this invention to the other. Rather, as the ribs pass helically about the hollow inner wall, they form places where they will be disposed directly in the path of the pressure being applied by the opposing flat plates as aforesaid, and will thereby act as a stop to the progression of buckling.

An unexpected advantage of composite tube of this invention, having helical ribs as aforesaid, is that they unobviously show better consistency of diametral dimension, e.g. the roundness, in the case of a circular cylindrical composite tube, as compared to composite tubes made using ribs that are merely longitudinal, and not helically disposed about the length of the composite tube, assuming the manufacturing precision is the same in both cases. In the case of helical ribbed composite tubes of this invention, these same considerations apply regardless of the cross sectional shape of the ribs, or their being radial or off-radial, as has been described herein.

The helical ribs can be disposed radially between the inner and outer walls in a position that is normal to both walls. They are preferably disposed "off-radial" so as to form helically disposed triangular or trapezoidal trusses. They can most preferably be disposed so as to form substantially trapezoidal truss shapes as aforesaid. In all of these cases, the same considerations as have been set forth above apply.

Producing helically ribbed twin walled composite tubular structures is not an easy accomplishment. Conventionally, the inner and outer tubes are extruded in a linear direction, with the inner and outer tubes being generally concentric to each other. The rib forming material is disposed by simultaneous extrusion in the same manner as in making longitudinal radial or "off-radial" ribs. Immediately upon the extrudate emerging from the extruder die, and before the extrudate has had an opportunity to harden, such as by cooling, the hollow walled composite tube is simultaneously taken away and twisted at a speed sufficient to draw down the walls to their desired final thickness as well as form the ribs into their desired helical pitch. The speed of extrusion and the speed of twisting of the extrudate must be closely coordinated to insure that the helical ribs are properly formed.

In making a product with helical ribs, it is necessary to provide relative rotation of the extruded product as it exits the die. This can be done in either of two ways: rotate the die while pulling the molten composite tube straight out in an axial direction, or keep the die stationary and rotate or twist the exiting composite tube as it is pulled away from the die. The technique of rotating the die is well known in the plastics extrusion industry and is quite applicable here. However, it has been found that the better approach is to maintain the die in a stationary condition and rotate the extruded composite tube. This can be accomplished by twisting the exiting tube to produce helical rib forms. It is preferred to accomplish this by using a novel mechanism that is described below.

The novel puller of this invention comprises a belt wound helically around the extruded tubular product. As the belt is driven, it pulls the tube downstream and simultaneously rotates it. One difficulty encountered by this operation is that the tension on the belt inherently applies sideways forces that tend to bend the tube. According to another aspect of this invention, this problem is solved by applying a second belt intertwined with the first belt, that exerts a longitudinal force in the same direction, but is out of phase with the first belt such that the sideways forces it applies to the tubular product are directly opposite to those of the first belt effectively countering the bending forces being exerted by the first belt This operation has the added advantage of applying a generally uniform radial squeeze so there is no flattening of the tube during pulling and twisting it.

The extrudate material may be plastic or metal. Polyethylene and polystyrene have worked well but there does not appear to be any specific limitation on the nature of the material being used to make the hollow wall cores of this invention so long as it is reasonably extrudable. The extrudability of the material is the prime consideration. Any material that extrudes well and solidified fairly rapidly, but not instantaneously, will serve as a suitable material from which to make the hollow wall composite tubes of this invention. If needed, auxiliary heat may be applied to maintain the extruded composite tube at the proper temperature to permit it to be rotated to form the ribs into helices.

It is considered to be within the scope of this invention to make the inner and outer tubes of different materials, respectively. The ribs may be made of the same material as either the inner or the outer tube, or of a completely different material.

As the composite tubular structure of this invention is made, it is preferably cut into lengths, as appropriate. It may also be coiled into a substantially endless length of composite tubing as is conventional in the art. Also, as is conventionally done, the tube can be cut without stopping the extrusion by using a cutter that may be suitably mounted to a carriage that travels along with the moving tube. However, because the advancing tube is also rotating, provision must be made to have the carriage move linearly at the same linear speed as the tube, yet allow the tube to rotate relative to the carriage. One way that this can be done is by using a set of wheels on the carriage with their axes parallel to the tube axis, to clamp the tube during cutting. If it is permitted or desirable to stop the extrusion process a non-helical cutter may be used.

It has also unexpectedly been found that the composite tube of this invention is a suitable starting material from which to produce a novel toy. It has been found that it is possible to cut the composite tube of this invention about a helical path while it is being longitudinally extruded, or thereafter, with or without imparting helical twist to the ribs thereof. This novel product is an unusually decorative "slinky". If the composite tube of this invention is cut along a helical line with a relatively short flight, the resulting article has the resiliency of a spring and can be suitably stretched and/or compressed in an axial direction. This article has flights that have a cross section that includes some number of ribs that have been cut along with the rest of the composite tube. On the other hand, if the helical cutter has the same flight as the helical ribs, it is possible to make a slinky with a continuous toroidal rib. The ribs maintain the spacing between the inner and the outer tube of each fight of the cut helix. It will be clear that the direction and flight distance of the helical cut must be coordinated with the pulling and twisting forces that are being applied to the extruded tube so that there is sufficient rib material to maintain the integrity of the composite walled structure in its spring shape.

The above and the following descriptions of the instant invention in all of its aspects has been exemplified by the use of one inner and one outer wall to form the composite tubular article hereof. It should be clear that this is not a limitation on the scope of this invention, but rather is illustrative thereof. A composite tubular structure with more than two walls is contemplated by this invention, and the entire disclosure hereof should be read with this in mind.

BRIEF DESCRIPTION OF THE DRAWINGS

FIG. 5 is a top view of an apparatus suited to pull tubular extrusions away from the extruder and twist the same into a helical form suited to forming the product shown in FIG. 3;

FIG. 6 is a front elevation of the apparatus shown in FIG. 5;

DETAILED DESCRIPTION OF THIS INVENTION

Figure 1:
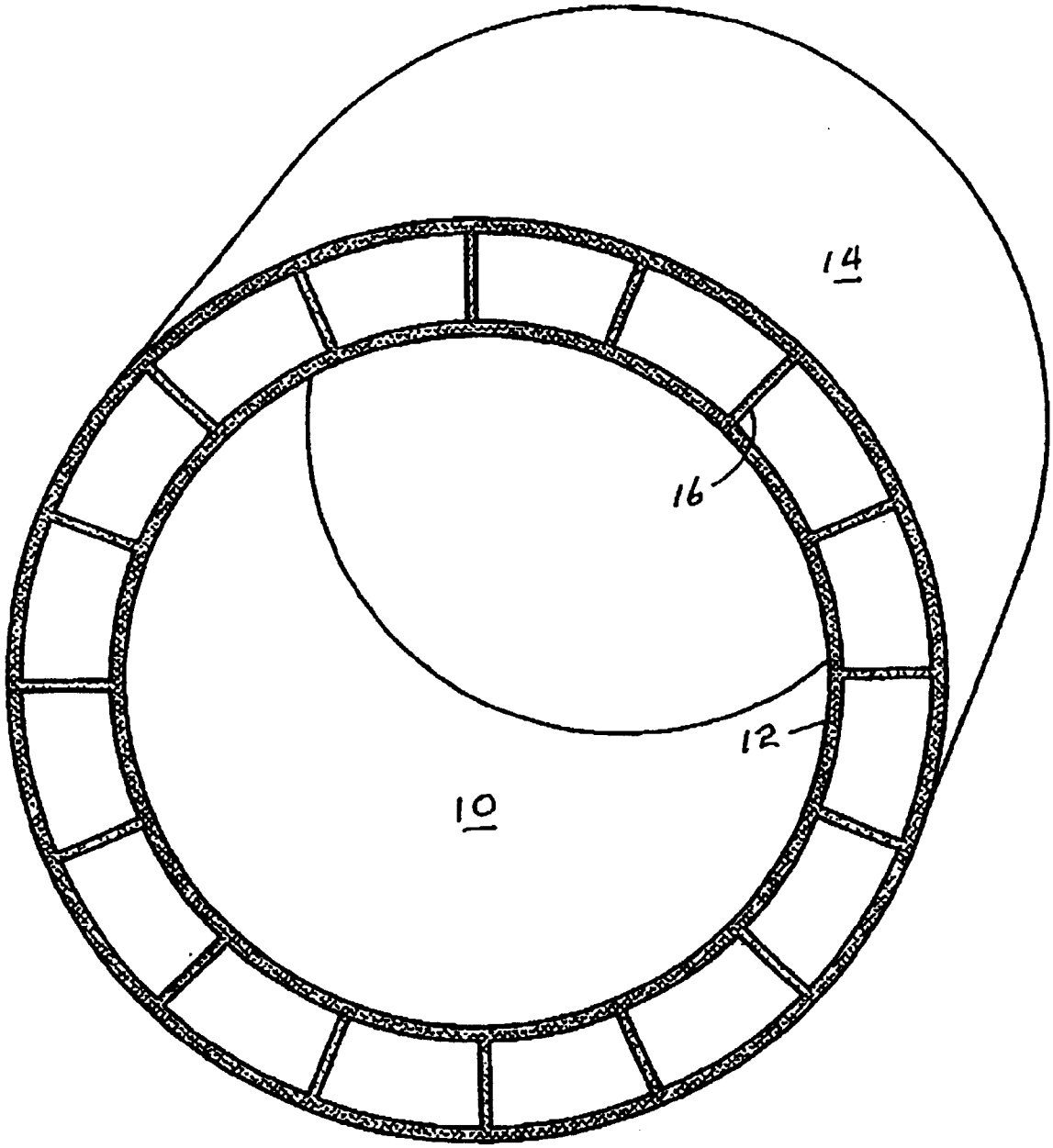
FIG. 1 is a perspective view of a hollow two walled tubular article with radial ribs.
Figure 2:
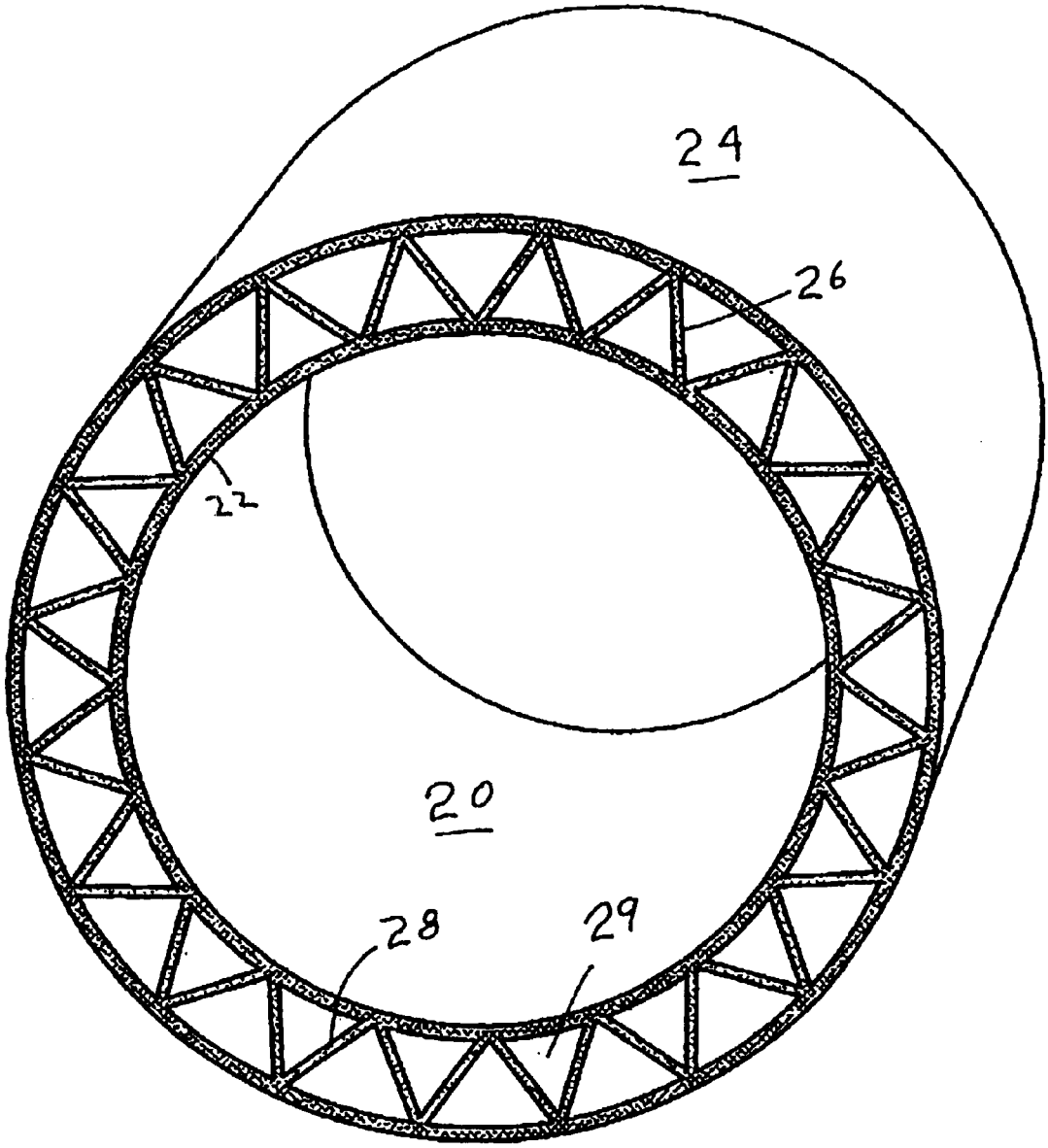
FIG. 2 is a perspective view of a hollow two walled tubular article with "off-radial" ribs forming generally triangular truss members.
Figure 4:
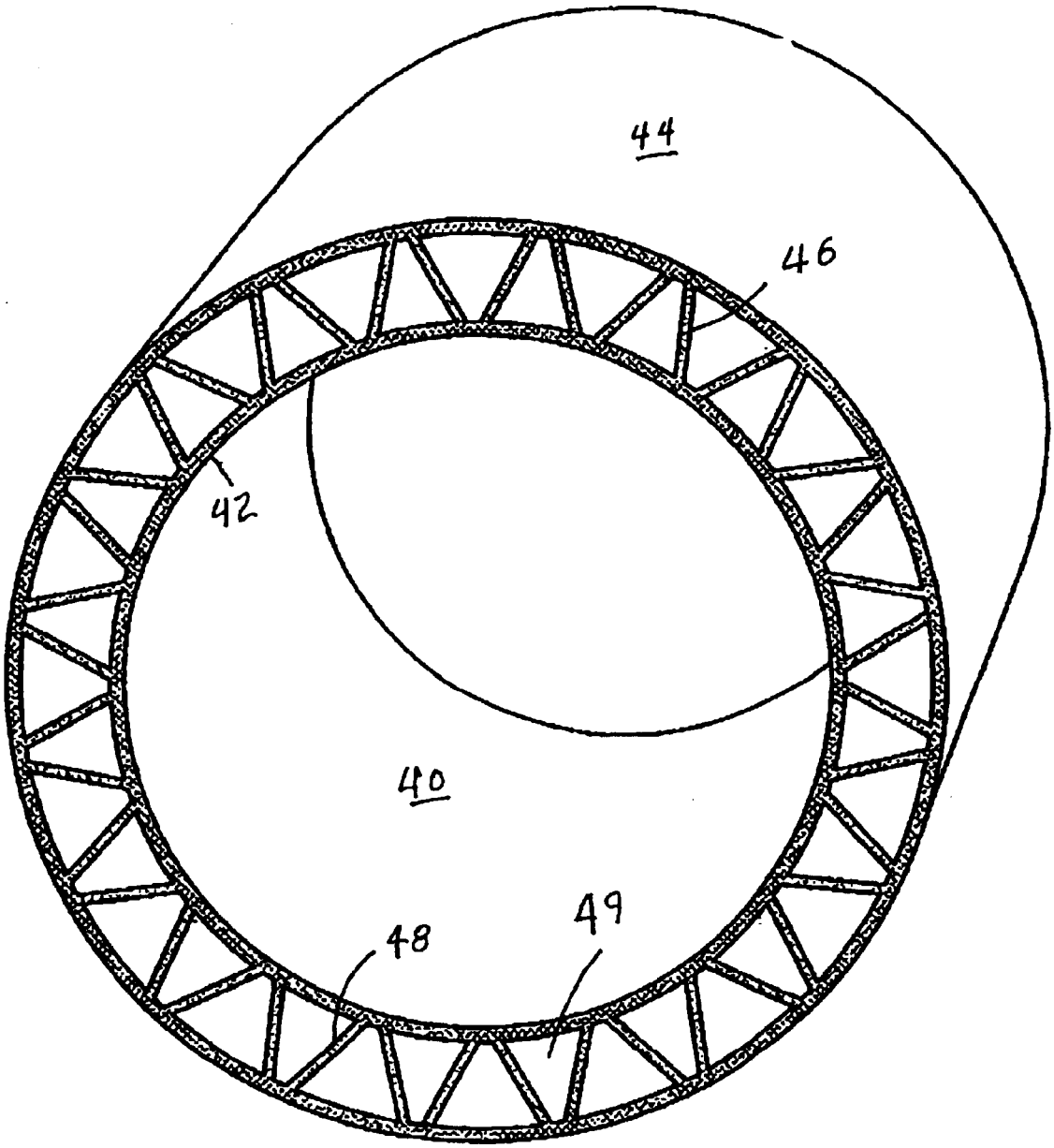
FIG. 4 is a perspective view of a hollow two walled article with "off-radial" ribs arranged to form trapezoidal truss members.

Reference will now be made to the drawing, wherein like parts have been given like reference numbers. Referring to FIG. 1, a composite tube 10 according to this invention is made up of an inner tube 12, an outer tube 14 and a plurality of ribs 16 therebetween. Referring to FIG. 2, a modified composite tube 20 of this invention is made up of an inner tube 22, and outer tube 24, a set of "left handed" "off radial" ribs 26 and an alternating set of right handed" "off-radial" ribs 28. Note that the combination of the inner tube, the outer tube and the two sets of ribs forms generally triangular truss cells 29. Referring to FIG. 4, a further modified composite tube 40 of this invention is made up of an inner tube 42, an outer tube 44, and a series of left and right handed alternating "off-radial ribs" 46 and 48, respectively. Note that the left and right handed ribs contact and are joined to the inner and outer tubes, respectively, out of contact with each other. This is to be compared to the structure shown in FIG. 2 where the left and right handed ribs contact each other at the same place as they contact the inner and outer tubes, respectively. In FIG. 4, the truss cells 49 that have been created have a generally trapezoidal cross section.

Figure 3:
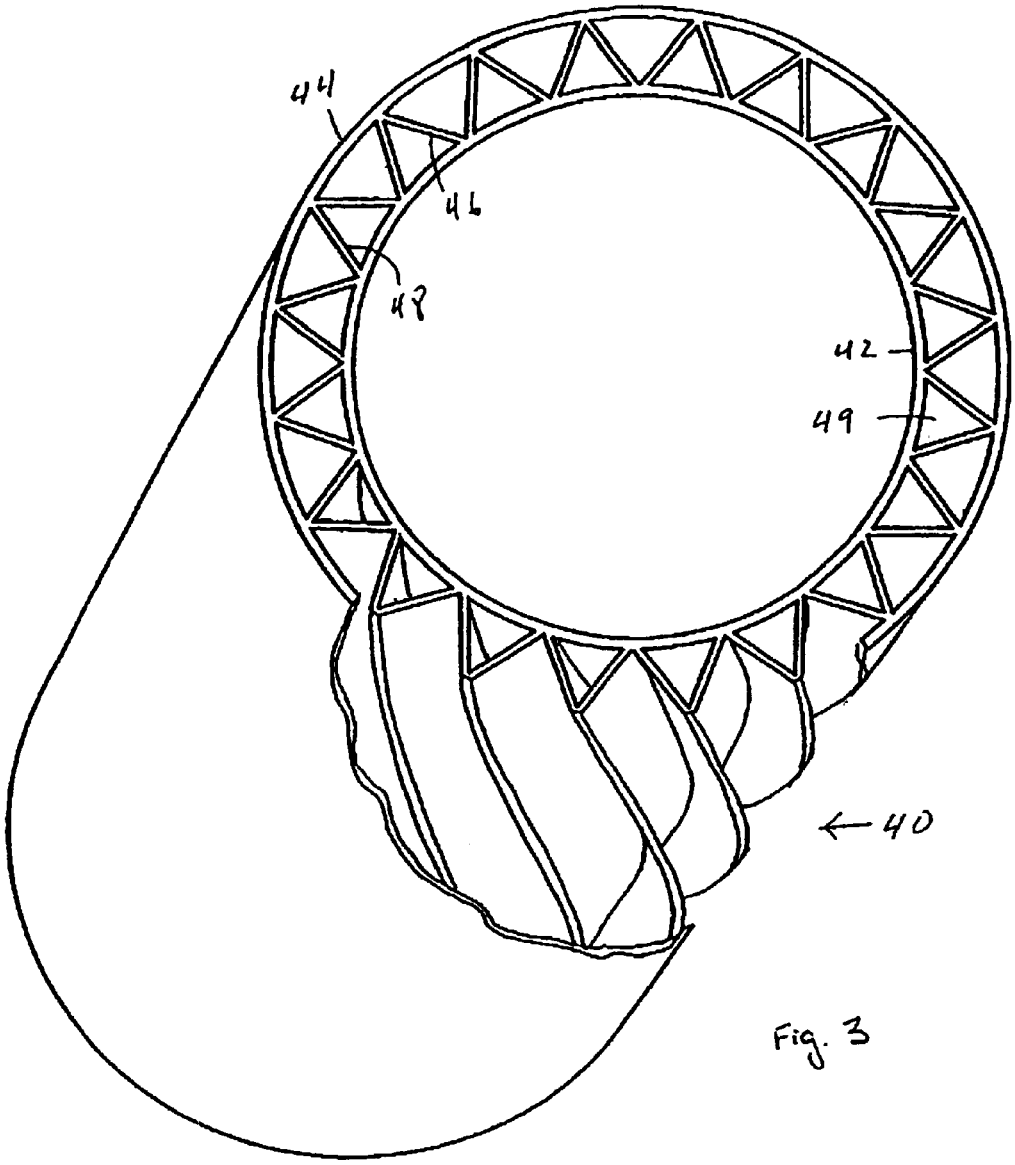
FIG. 3 is a perspective view, with portions cut away, of a hollow two walled tubular article with helically disposed "off-radial" ribs forming triangular truss members.

Referring to FIG. 3, there is shown a composite tube 40 of this invention that has a cross section that is similar to that shown in FIG. 2. The composite tube 40, whose cross section was shown in FIG. 2, has been twisted to cause the ribs 46 and 48 to have a helical form.

Referring to FIGS. 3 and 6, there is shown an apparatus for forming a composite tube having helical rib structures according to this invention. The extruded composite tube 50 is proceeding from right to left in this figure. A driven belt 52 is relatively tightly wrapped around the composite tube 50 in a helical configuration, and means 54 are provided for driving the belt whereby twisting the composite tube such that the internal ribs (not shown in this figure) conform to the shape depicted in FIG. 3.

Figure 7:
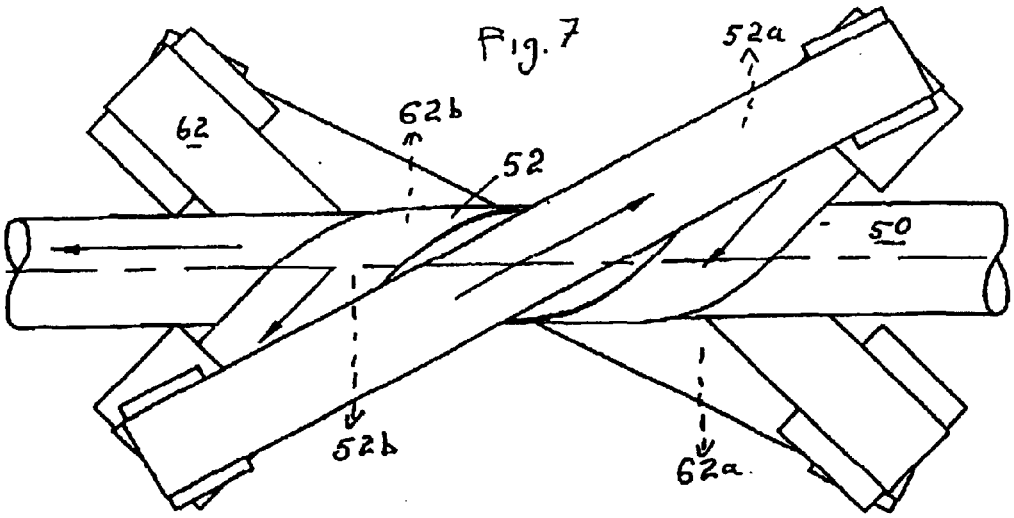
FIG. 7 is a top view of an apparatus using two intertwined pullers to pull tubular extrusions away from the extruder and twist the same into a helical form suited to forming the product shown in FIG. 3 without exerting undue sideways forces on the tube.
Figure 8:
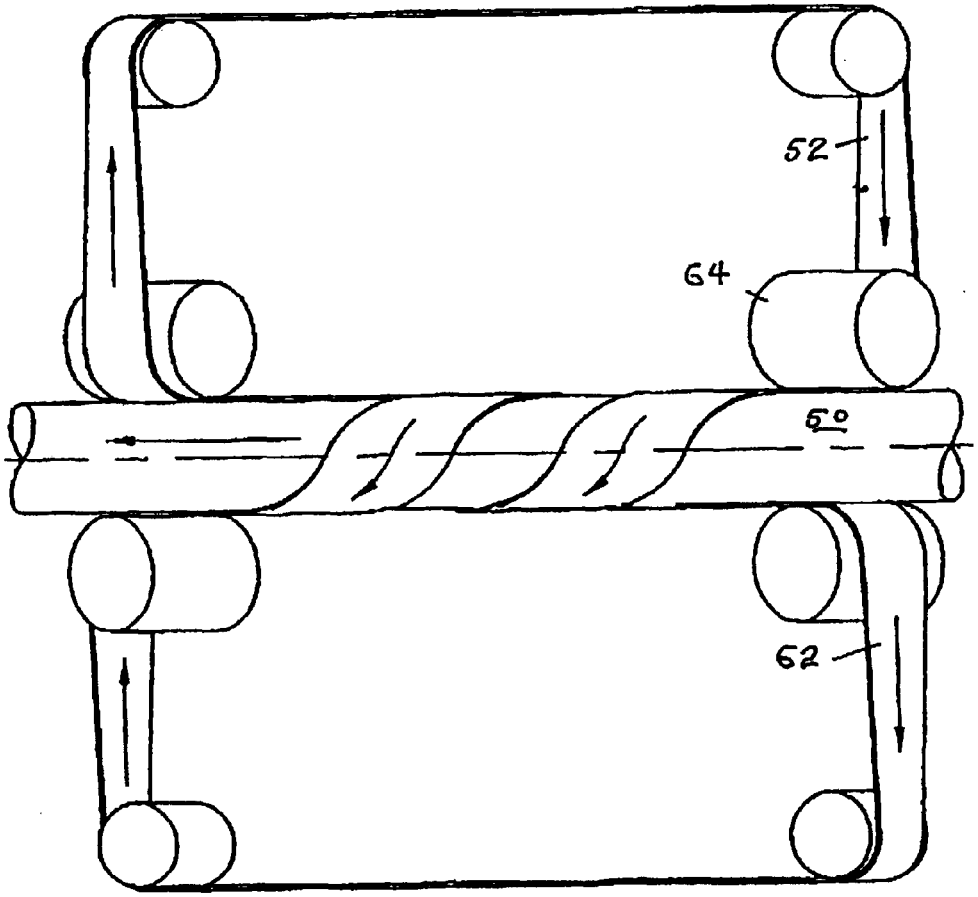
FIG. 8 is a front elevation of the apparatus shown in FIG. 7

FIGS. 7 and 8 show an apparatus that is similar to that shown in FIGS. 5 and 6 but with two intertwined belts 52 and 62, both pulling and rotating the tube 50 in the same direction. The first belt 52 exerts lateral forces 52a and 52b on the tube 50 which are axially displaced from each other, thus providing a bending moment on the tube 50. The bending forces are exactly equal and opposite to, and thereby cancelled by, the forces 62a and 62b that are being exerted by the belt 62. The result is that there is no total bending moment applied to the tube 50 by the twisting mechanism of this aspect of this invention.

The nature of the material of the driving belt is not particularly critical. Its surface should have sufficient coefficient of friction relative to the mateial of the extruded composite tube that it will be able to drive the tube without crushing or marring its surface. In most instances, the surface of the drive belt will be smooth so that it does not mar the surface of the composite tube. However, the driving belt may be used to impart a profiling to the surface of the composite tube.

Figure 9:
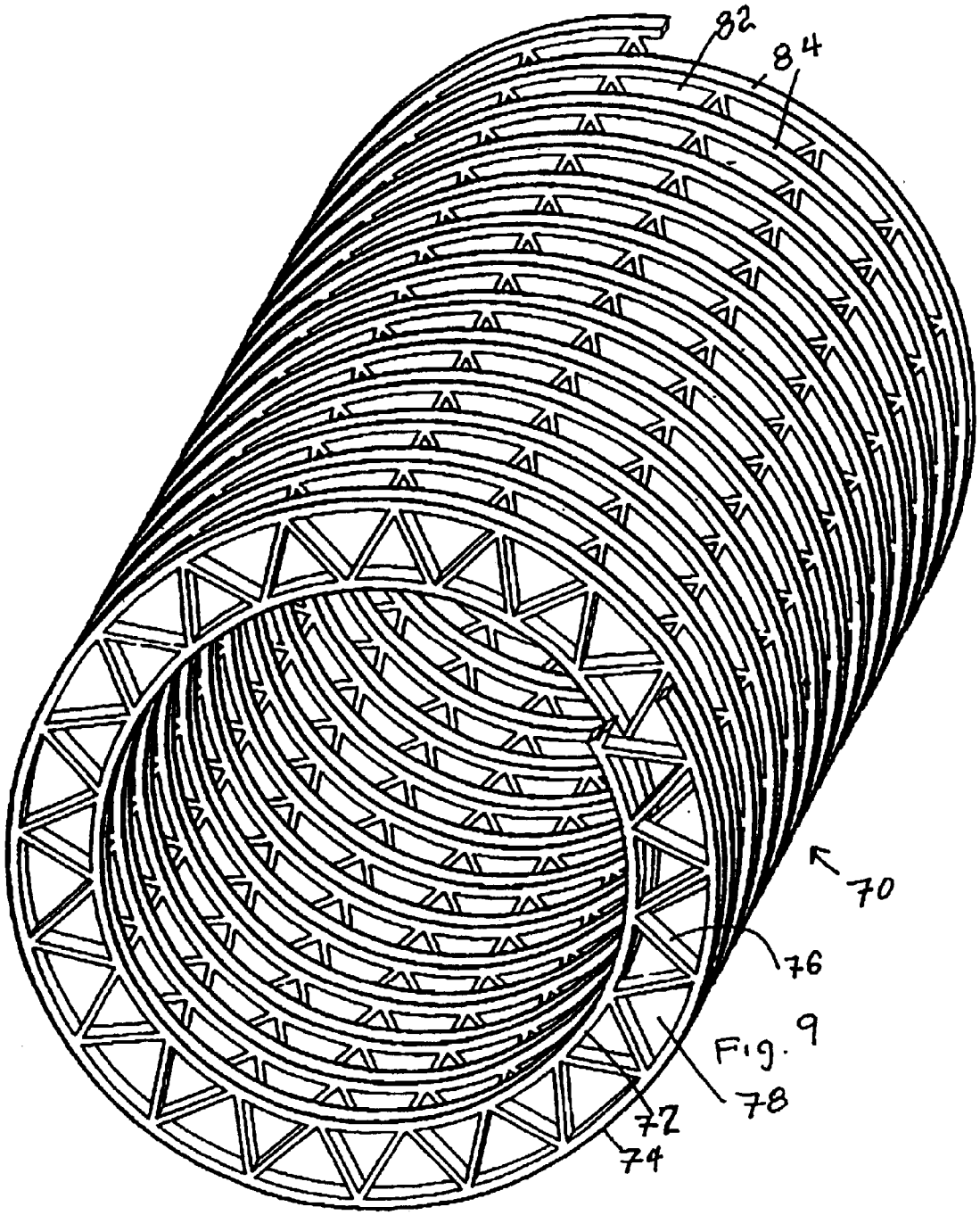
FIG. 9 is a perspective view of a "slinky" spring like article according to this invention.
Figure 10:
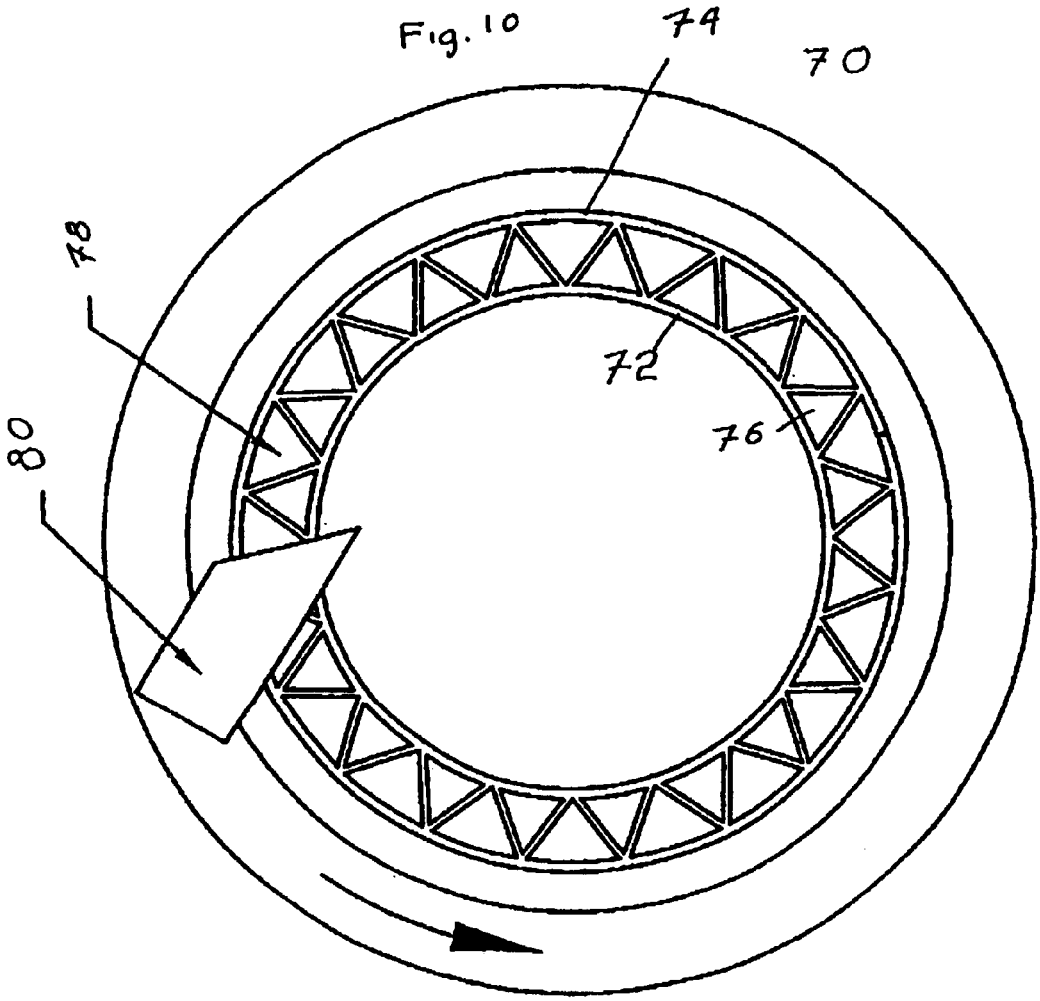
FIG. 10 is a sectional end view of a cutter acting on the composite tube of this invention

Referring now to FIGS. 9 and 10, there is shown a novel toy that is simply made from the composite tube of this invention. This toy is akin to a "slinky" and may be formed from the composite tube of this invention regarless of the material from which the tube has been fabricated. Tho composite tube 70 is made up of an inside wall 72, an outside wall 74, and ribs 76 disposed in supporting relationship therebetween, and forming suitably shaped truss cells 78. The composite tube 70 is suitable helically cut, using a rotating cutter 80 so as to form a helix 82 having a plurality of flights 84. The helix can be stretched in a longitudinal directions in the same way that a spring is stretchable, but it is reasonably rigid in the transverse direction. It is possible to make the ribs and the inner and outer tubes from the same materials and in the same colors. It is preferred, however, to make these elements of different color materials so as to add to their eye appeal.

What is claimed is:

1. A [composite tube] *structure* comprising at least one axially elongated, substantially rigid inner [tubular wall] *member having an outwardly directed substantially cylindrical surface*, at least one axially elongated, substantially rigid outer tubular [wall] *member having an inwardly directed substantially cylindrical surface radially* spaced from said [inner tubular wall] *outwardly directed surface*, and a plurality of substantially rigid ribs [helically] disposed in the space between the [inner and outer walls,] *inwardly directed surface and the outwardly directed surface,*

*wherein a first plurality of said ribs are disposed in a positive angular direction other than perpendicular with respect to at least one of said surfaces and a second plurality of said ribs are disposed in a negative angular direction with respect to said perpendicular,*

*wherein at least one pair of said positive and negative non-perpendicular ribs that are next adjacent to each other are in contact with both said outwardly directed and said inwardly directed surfaces* [wherein at least some of said ribs are joined to both said inner and outer walls along] *over at least* a [sufficient] portion [of the axial length] of said [walls] *structure;*

*wherein said pair of ribs,* [to maintain the spacing between said walls] *together with portions, respectively, of said surfaces intercepted by said ribs, form substantially triangular or trapezoidal truss cells at least over said portion of said structure, and*

*wherein said structure is axially twisted such that said inner and outer members, and at least some of said truss cells, are disposed, over at least a portion of the length of the structure, in a composite of longitudinal and a circumferential directions.*

2. A [composite tube] *structure* as claimed in claim 1 wherein said [inner] *inwardly directed* and [outer walls] *said outwardly directed surfaces* are concentric *over at least a portion of said structure.*

3. A [composite tube] *structure* as claimed in claim 1 wherein some of said ribs are *disposed* substantially normal to said [inner wall] *outwardly directed surface.*

4. A [composite tube] *structure* as claimed in claim 1 wherein [at least some] *all* of said ribs are disposed at an angle, that differs from perpendicular, with respect to said [inner tubular wall] *outwardly directed surface; and wherein said entire structure is at least partially helical in orientation.*

[5. A composite tube as claimed in claim 1 wherein at least some of said ribs alternate in the direction of their angle with resect to normal to said inner tube.]

6. [A composite tube as claimed in claim 1] *An unseamed structure comprising an inner member having a substantially cylindrical outwardly directed wall and an outer tubular member having an inwardly directed wall, and a plurality of ribs at least some of which are in supporting relationship to said members,* wherein at least some of said ribs are simultaneously contacted and [adhered to at least one] *an integral part of both of* said [inner and outer tubes] *inwardly directed and outwardly directed surfaces*, respectively, as well as to a next, adjacent rib at substantially the same location [of said rib and tube] *on said surfaces* so as to [form generally] *form, together with an intercepted portion of either said inwardly directed surface or said outwardly directed surface, respectively,* [generally] *at least one substantially* triangular [longitudinal] truss cell[s] *and wherein said entire structure, comprising said inner member, said outer member and integral triangular truss cell is twisted so that the entire structure has a circumferential as well as longitudinal disposition.*

7. A [composite tube] *structure* as claimed in claim 6 wherein *all of* said ribs are longitudinally contacted and [adhered to] *an integral part of* both of said [inner and outer tubes] *inwardly directed and outwardly directed surfaces*, respectively.

8. A [composite tube] *structure* as claimed in claim 6 wherein all of said ribs are alternately disposed at positive and negative angles, respectively, with respect to a perpendicular to said [wells] *surfaces.*

9. A [composite tube] *structure* as claimed in claim 1 wherein at least some of said ribs are [simultaneously contacted and adhered to] *seamlessly integrated with* at least one of said [inner and outer tubes] *surfaces*, respectively, at a location that is spaced from the location where [the] *a* next adjacent rib[s are contacted with and adhered to said inner and outer tubes] *is seamlessly integrated with at least one of said surfaces* so as [to] *to, together with the inwardly directed and outwardly directed surfaces disposed between said rib integration points, respectively,* form [generally longitudinal] truss cells having [a] substantially trapezoidal cross sections.

10. A [composite tube] *structure* as claimed in claim 9 wherein all of said ribs are alternately disposed at positive and negative angles [away from normal with respect to said inner and outer tubes] *with respect to perpendicular to said inwardly directed surface and said outwardly directed surface, respectively.*

11. A [composite tube] *structure* as claimed in claim 1 wherein said [ribs] *truss cells* extend the entire longitudinal length of said [composite tube] *structure.*

12. A [composite tube] *structure* as claimed in claim 1 wherein [all of said ribs are disposed helically between said inner and outer tubes] *said entire structure is in the shape of a helix.*

13. A [composite tube] *structure* as claimed in claim 1 wherein consisting essentially of [one] *a monolith consisting essentially of an* inner substantially rigid [tube and one] *tubular member, an* outer substantially rigid [tube] *tubular member, and a plurality of ribs in supporting and spacing relationship to said inner and outer tubular members;*

*wherein at least one pair of next adjacent ribs are alternately disposed at positive and negative angles with respect to a perpendicular to said surfaces; and*

*wherein said tubular members and said ribs are disposed in a helical configuration.*

14. A [composite tube] *structure* as claimed in claim 1 wherein said [tubes] *members* are *substantially* concentric and have a substantially circular cross section.

[15. A composite tube as claimed in claim 1 wherein at least some of said ribs are disposed at angles other than perpendicular to said inner and outer walls.]

*16. A structure as claimed in claim 1 which is formed as a monolith.*

*17. A structure as claimed in claim 1 comprising a plurality of said truss cells substantially equidistantly circumferentially distributed about the circumference of said outwardly directed surface.*

*18. A structure as claimed in claim 6 comprising a plurality of said truss cells substantially equidistantly circumferentially distributed about the circumference of said outwardly directed surface.*

*19. A structure as claimed in claim 9 comprising a plurality of said truss cells substantially equidistantly circumferentially distributed about the circumference of said outwardly directed surface.*

*20. A structure as claimed in claim 6 comprising a plurality of said substantially triangular truss cells having apexes that are directed toward said outwardly directed surface and said inwardly directed surface, alternately.*

*21. A structure as claimed in claim 9 comprising a plurality of said substantially trapezoidal truss cells wherein next adjacent trapezoidal truss cells have shorter sides that are alternately a portion of said outwardly directed surface and said inwardly directed surface, respectively.*

*22. A structure as claimed in claim 1 consisting essentially of a monolithic extrudate.*

*23. A structure as claimed in claim 6 consisting essentially of a monolithic extrudate.*

*24. A structure as claimed in claim 9 consisting essentially of a monolithic extrudate.*

*25. A monolithic, seamless plastic extrudate structure comprising an inner member having an outwardly directed, substantially cylindrical surface; an outer member having an inwardly directed, substantially cylindrical surface spaced from said outwardly directed surface; and a plurality of ribs, disposed between and integral with said inner and outer members, and forming together therewith a plurality of truss cells each comprising next adjacent positively angularly directed and negatively angularly directed ribs, with respect to a perpendicular to said outwardly directed surface, and a portion of at least one of said outwardly directed surface and said inwardly directed surface intercepted by said ribs;*

*wherein at least one truss cell comprises a line where a rib, disposed at a negative angle to said perpendicular, intersects said outwardly directed surface, and a line where a next adjacent rib, disposed at a positive angle to said perpendicular, intersects said outwardly directed surface, wherein said lines are proximate to each and at most slightly separated from each other intercepting at most a small portion of said surface and thereby forming truss cells that are non-rectangular;*

*wherein said monolithic structure is twisted about a longitudinal axis of said structure so that at least a portion of each of said inner member, said outer member and said ribs are disposed in a direction that is a composite of both longitudinal and circumferential directions.*

*26. An extrudate as claimed in claim 25 wherein said disposition is helical.*

*27. An extrudate as claimed in claim 25 wherein said disposition is for the entire longitudinal length of said structure.*

*28. An extrudate as claimed in claim 25 wherein the intersection between said ribs and said surfaces occurs during extrusion and is seamless.*

*29. An extrudate as claimed in claim 25 wherein at least some of said ribs are substantially rectangular in cross section.*

*30. An extrudate as claimed in claim 25 wherein said inner member is tubular.*

*31. An extrudate as claimed in claim 25 comprising polyethylene.*

*32. An extrudate as claimed in claim 25 comprising polystyrene.*

*33. The structure product of a process, said process comprising:*

*extruding, from an extruder, a monolithic molten structure comprising an inner member, an outer member spaced from said inner member, and a plurality of ribs extending between, and integral with, said inner and outer members, wherein at least a portion of said ribs are disposed at an angle, other than right, with respect to a perpendicular to said inner member;*

*cooling said molten structure sufficient to impart structural integrity to said structure;*

*pulling said cooled structure along its longitudinal axis;*

*twisting said cooled structure about its longitudinal axis;*

*whereby causing said structure in its molten state as it is extruded to be simultaneously pulled away from the extruder and twisted about its longitudinal axis while still in a deformable condition; and*

*whereby causing all of said extruded molten structure to be twisted into an orientation such that all of said structure has a longitudinal component and a circumferential component while still in a deformable state;*

*cooling said integral structure sufficient to fix a twist in all of said structure; and*

*recovering finite lengths of said cooled, twisted structure.*

*34. The product claimed in claim 33 wherein said inner member, said outer member and said ribs are commonly extruded and thus constitute a seamless monolithic structure.*

*35. The product claimed in claim 33 wherein said pulling and twisting steps are applied to said extrudate after it has solidified, and wherein pulling and twisting said solidified structure causes said molten extrudate to be pulled and twisted while it is in a deformable state.*

*36. A helically configured composite tube comprising at least one axially elongated, substantially rigid inner tubular wall, at least one axially elongated, substantially rigid outer tubular wall spaced from said inner tubular wall, and a plurality of substantially rigid ribs disposed in the space between said the inner and outer walls;*

*wherein at least some of said ribs are joined to both said inner and outer walls along a sufficient portion of the axial length of said walls to maintain space between the walls;*

*wherein at least some of said ribs are simultaneously contacted and seamlessly adhered to said inner and outer tubes, respectively, as well as to a next adjacent rib at substantially the same location of said rib and tube to form generally triangular truss cells; and*

*wherein said composite tube has been twisted about its longitudinal axis into a helix.*

*37. A composite tube as claimed in claim 36 that is a seamless monolithic extrudate.*

*38. A helically configured composite structure comprising at least one axially elongated, substantially rigid inner cylindrical wall, at least one axially elongated, substantially rigid outer tubular wall concentric with, and spaced from, said inner cylindrical wall, and a plurality of substantially rigid ribs disposed in space between said the inner and outer walls;*

*wherein at least some of said ribs are integral with both said inner and outer walls along a sufficient portion of the axial length of said walls to maintain the space between the walls;*

*wherein said ribs comprise first ribs disposed at a positive angle with respect to a perpendicular to said inner and outer tubular walls, and second ribs disposed at a negative angle with respect to a perpendicular to said inner and outer walls,*

*wherein at least some of said first ribs are contacted with and seamlessly integral with said inner cylindrical wall and said outer tube, respectively,*

*wherein at least some of said second ribs are contacted with and seamlessly adhered to said inner cylindrical and outer tubular walls such that a positively angled rib and a next adjacent negatively angled rib are integral with said inner cylinder or outer tubular wall at first spaced apart locations and are integral with the other of said inner or outer tubular wall at second locations that are further spaced apart than said first locations;*

*wherein said next adjacent ribs and the intercepted portions of said inner and outer tubular walls form truss cells having a generally trapezoidal cross section; and*

*wherein the entirety of said composite tube is twisted about its longitudinal axis into a helix.*

*39. A composite tube as claimed in claim 38 that is a single extrudate monolith.*

*40. A composite tube as claimed in claim 36 wherein said ribs are not substantially thicker than one of said tubular walls.*

*41. A composite tube as claimed in claim 38 wherein said ribs are not substantially thicker than one of said tubular walls.*

*42. A composite tube comprising at least one axially elongated, substantially rigid inner tubular wall, at least one axially elongated, substantially rigid outer tubular wall spaced from said inner tubular wall, and a plurality of substantially rigid ribs disposed in the space between the inner and outer walls; wherein at least some of said ribs are joined to both the inner and outer walls along a sufficient portion of the axial length of said walls to maintain the spacing between the walls and wherein at least some of said ribs are simultaneously contacted and adhered to at least one of said inner and outer tubes, respectively, as well as to a next adjacent rib at substantially the same location of said rib and tube so as to form generally triangular longitudinal truss cells;*

*wherein all of the elements of said tube have circumferential as well as longitudinal disposition.*

*43. A composite tube as claimed in claim 42 wherein said truss cells follow a substantially helical path for at least a substantial portion of their length.*

*44. A composite tube comprising at least one axially elongated, substantially rigid inner tubular wall, at least one axially elongated, substantially rigid outer tubular wall spaced from said inner tubular wall, and a plurality of substantially rigid ribs disposed in the space between the inner and outer walls; wherein at least some of said ribs are joined to both the inner and outer walls along a sufficient portion of the axial length of said walls to maintain the spacing between the walls and wherein at least some of said ribs are simultaneously contacted and adhered to at least one of said inner and outer tubes, respectively, at a location that is spaced from the location where the next adjacent ribs are contacted with and adhered to said inner and outer tubes so as to form generally longitudinal truss cells having a substantially trapezoidal cross section;*

*wherein all of the components of said tube are disposed in a pattern having longitudinal and circumferential vector components.*

*45. A composite tube comprising at least one axially elongated, substantially rigid inner tubular wall, at least one axially elongated, substantially rigid outer tubular wall spaced from said inner tubular wall, and a plurality of substantially rigid ribs disposed in the space between the inner and outer walls; wherein at least some of said ribs are integral with both the inner and outer walls along a sufficient portion of the axial length of said walls to maintain the spacing between the walls and wherein at least some of said ribs are simultaneously contacted and adhered to at least one of said inner and outer tubes, respectively, as well as to a next adjacent rib at substantially the same location of said rib and tube so as to form generally triangular longitudinal truss cells, wherein all of said ribs are alternately disposed at positive and negative angles, respectively, with respect to a perpendicular to said walls, and wherein all of the elements of said composite tube are disposed along a path that has longitudinal as well as circumferential vector components.*

*46. A composite tube as claimed in claim 45 wherein said truss cells follow a path that is directed in a substantially circumferential as well as longitudinal direction.*

*47. A composite tubular monolith having circumferential as well as longitudinal disposition and comprising at least one axially elongated, substantially rigid inner tubular wall, at least one axially elongated, substantially rigid outer tubular wall spaced from said inner tubular wall, and a plurality of substantially rigid ribs helically disposed in the space between the inner and outer walls; wherein at least some of said ribs are joined to both the inner and outer walls along a sufficient portion of the axial length of said walls to maintain the spacing between the walls and wherein at least some of said ribs are simultaneously contacted with and an integral part of at least one of said inner and outer tubes, respectively, at a location that is spaced from the location where the next adjacent ribs are contacted with said inner and outer tubes so as to form generally longitudinal truss cells having a substantially trapezoidal cross section and wherein all of the ribs are alternatively disposed at positive and negative angles away from normal with respect to a perpendicular from said inner and outer tubes; wherein all of the elements of said monolith have a helical configuration.*

* * * * *

UNITED STATES PATENT AND TRADEMARK OFFICE

CERTIFICATE OF CORRECTION

PATENT NO. : RE 39,521 E
APPLICATION NO. : 10/366652
DATED : March 20, 2007
INVENTOR(S) : F. John Herrington It is certified that error appears in the above-identified patent and that said Letters Patent is hereby corrected as shown below:

Cover page:

Item (56):

--At the end of the list of US references add:

3,926,223 A * 9/1969 Seffenini
3,926,233 A * 12/1975 Petzetrakis
4,906,496 A * 3/1990 Hosono et al.
5,433,252 A * Wolf et al.--

At the end of the list of foreign patent documents add:

--WO/91/11012 PCT
WO/00/09317 PCT
DE 39 27 569 A1 Germany
DE 39 39 714 A1 Germany
1432291 4/1976 UK
1000809 8.1965 UK--

After item [56] citing "Foreign Patent Documents" add:

--Commercial A, Photograph of commercial product sold by Diamond International Incorporated Commercial B, Photograph of commercial product sold by Lamson and Sessions--

Signed and Sealed this

Twenty-second Day of May, 2007

JON W. DUDAS
*Director of the United States Patent and Trademark Office*